US012795778B2

(12) United States Patent
Chen et al.

(10) Patent No.: US 12,795,778 B2
(45) Date of Patent: Nov. 10, 2026

(54) POWER SAVING BY DATA THROUGHPUT PATTERN PREDICTION IN WIRELESS COMMUNICATIONS

(71) Applicant: MediaTek Singapore Pte. Ltd., Singapore (SG)

(72) Inventors: Hung-Yueh Chen, Seongnam-si (KR); Byeng Hyun Kim, Seongnam-si (KR); Jung Shup Shin, Seongnam-si (KR); Pei-Tsung Wu, Hsinchu City (TW); Wei-Hao Pan, Hsinchu City (TW); Shih-Wei Sun, Hsinchu City (TW); Wei-Ming Yin, Hsinchu City (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 595 days.

(21) Appl. No.: 18/230,341

(22) Filed: Aug. 4, 2023

(65) Prior Publication Data

US 2025/0048493 A1 Feb. 6, 2025

(51) Int. Cl.

| | |
|---|---|
| ***H04W 4/00*** | (2018.01) |
| ***H04W 52/02*** | (2009.01) |
| ***H04W 76/27*** | (2018.01) |
| ***H04W 76/38*** | (2018.01) |

(52) U.S. Cl.

CPC ....... *H04W 76/38* (2018.02); *H04W 52/0225* (2013.01); *H04W 76/27* (2018.02)

(58) Field of Classification Search

CPC . H04W 76/38; H04W 52/0225; H04W 76/27; H04W 76/30

See application file for complete search history.

(56) References Cited

U.S. PATENT DOCUMENTS

| | | | | |
|---|---|---|---|---|
| 2015/0365997 | A1* | 12/2015 | Jeong | H04W 52/0251 370/311 |
| 2023/0276532 | A1* | 8/2023 | Yang | H04W 52/0251 370/329 |
| 2024/0298377 | A1* | 9/2024 | Lee | H04W 76/30 |
| 2024/0414613 | A1* | 12/2024 | Wang | H04L 41/082 |
| 2026/0143555 | A1* | 5/2026 | Liu | H04W 76/27 |

* cited by examiner

*Primary Examiner* — Edan Orgad
*Assistant Examiner* — Hidayat Dabiri
(74) *Attorney, Agent, or Firm* — Andy M. Han; Han IP PLLC

(57) ABSTRACT

Techniques pertaining to power saving by data throughput pattern prediction in wireless communications are described. A user equipment (UE) determines whether a probability of a first value being greater than a second value is higher than a threshold. The UE triggers a radio resource control (RRC) connection release with a network responsive to the probability being higher than the threshold. The first value represents a succeeding continuous duration of no uplink (UL) and downlink (DL) data. The second value represents an RRC inactivity timer duration plus a threshold duration.

18 Claims, 6 Drawing Sheets

POWER SAVING BY DATA THROUGHPUT PATTERN PREDICTION IN WIRELESS COMMUNICATIONS

TECHNICAL FIELD

The present disclosure is generally related to wireless communications and, more particularly, to power saving by data throughput pattern prediction in wireless communications.

BACKGROUND

Unless otherwise indicated herein, approaches described in this section are not prior art to the claims listed below and are not admitted as prior art by inclusion in this section.

In wireless communications, such as mobile communications under the 3$^{rd}$ Generation Partnership Project (3GPP) specification(s) for 5th Generation (5G) New Radio (NR), a radio resource control (RRC) inactivity timer on the network side expires when there is no uplink (UL) and downlink (DL) data for a predefined period (e.g., 10 seconds). Upon expiry of the RRC inactivity timer, the network triggers RRC connection release with a user equipment (UE). However, under current 3GPP specification(s), the UE would stay in a RRC connected state for the predefined period (e.g., 10 seconds) without any UL or DL data transmission before expiry of the RRC inactivity timer. This would cause unnecessary power consumption on the part of the UE while it stays in the RRC connected state. As power saving is one of the most important features of UEs, there is a need for a solution of power saving, such as power saving by data throughput pattern prediction.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions involving power saving by data throughput pattern prediction in wireless communications. It is believed that implementations of various proposed schemes in accordance with the present disclosure may address or otherwise alleviate aforementioned issue(s) (e.g., by improving power saving in screen-off and long idle-time scenarios).

In one aspect, a method may involve a UE determining whether a probability of a first value being greater than a second value is higher than a threshold. The first value may represent a succeeding continuous duration of no UL and DL data. The second value may represent an RRC inactivity timer duration plus a threshold duration. The method may also involve the UE triggering an RRC connection release with a network responsive to the probability being higher than the threshold.

In another aspect, a method may involve a UE determining that at least one of a plurality of early RRC connection release criteria is not fulfilled. The method may also involve the UE triggering an early RRC connection release with a network responsive to the determining.

In yet another aspect, an apparatus implementable in a UE may include a transceiver configured to communicate wirelessly and a processor coupled to the transceiver. The processor may extract a plurality of features, as input parameters, according to data throughput patterns and screen-on/off status of the UE. The processor may also determine, based on a result of the extracting, whether a probability of a first value being greater than a second value is higher than a threshold. The processor may further trigger, via the transceiver, an RRC connection release with a network responsive to the probability being higher than the threshold The first value may represent a succeeding continuous duration of no UL and DL data. The second value may represent an RRC inactivity timer duration plus a threshold duration.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies such as, for example and without limitation, Evolved Packet System (EPS), Long-Term Evolution (LTE), LTE-Advanced, LTE-Advanced Pro, Internet-of-Things (IoT), Narrow Band Internet of Things (NB-IoT), Industrial Internet of Things (IoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to power saving by data throughput pattern prediction in wireless communications. According to the present disclosure, a number of possible solutions may be implemented separately or jointly. That is, although these possible solutions may be described below separately, two or more of these possible solutions may be implemented in one combination or another.

Figure 1:
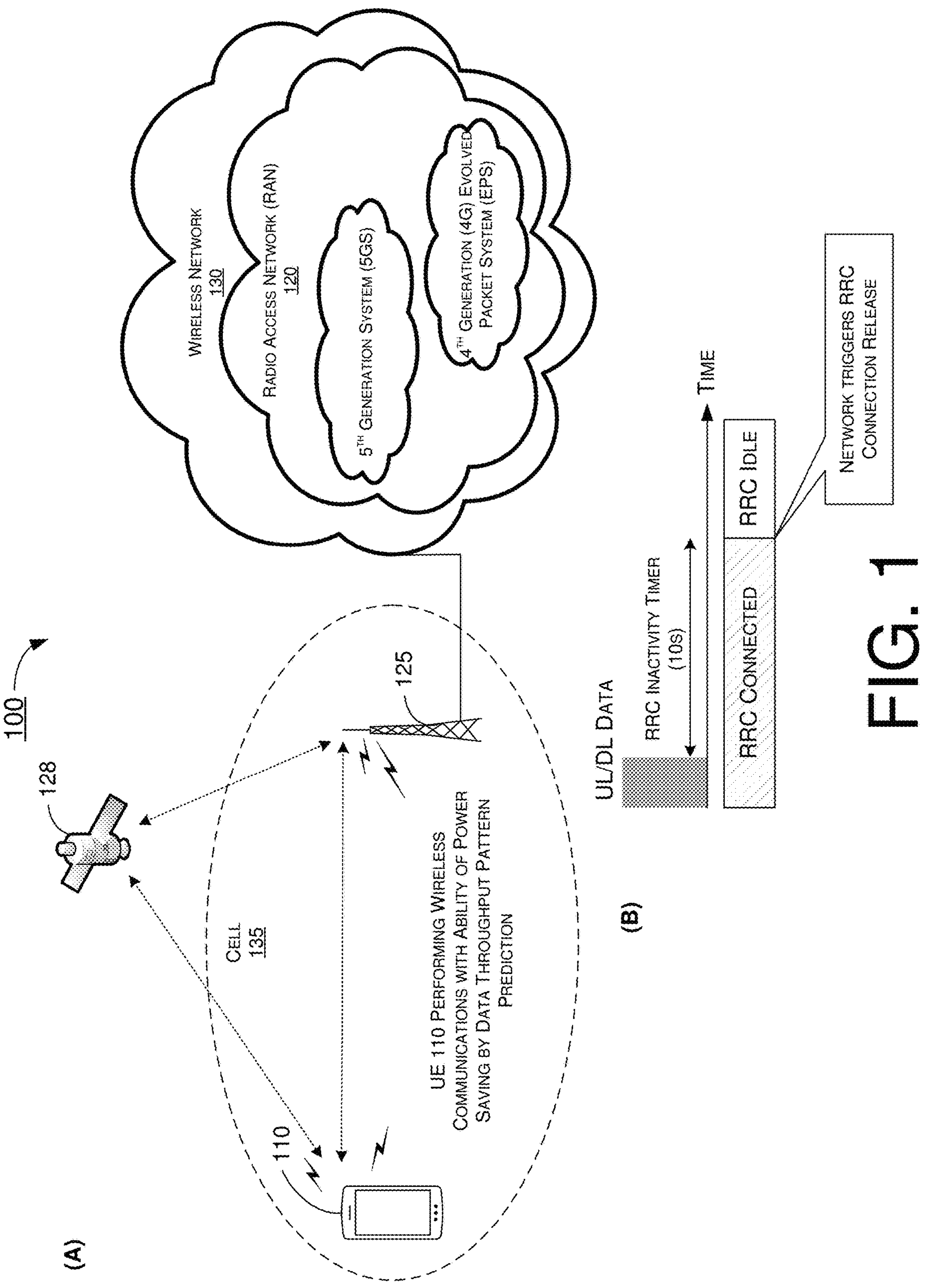
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

Referring to part (A) FIG. 1, network environment 100 may involve a UE 110 in wireless communication with a RAN 120 (e.g., a 5G NR mobile network or another type of network such as an NTN). UE 110 may be in wireless communication with RAN 120 via a base station or network node 125 (e.g., an eNB, gNB or transmit-receive point (TRP)) and/or a non-terrestrial network node 128 (e.g., a satellite). That is, UE 110 may be within coverage of a cell 135 associated with terrestrial network node 125 or non-terrestrial network node 128. RAN 120 may be a part of a network 130. Referring to part (B) of FIG. 1, UE 110 may be in an RRC connected state while an RRC inactivity timer is running (e.g., with a duration of 10 seconds) until expiry of the RRC inactivity timer, at which time network 130 may trigger (e.g., via terrestrial network node 125 or non-terrestrial network node 128) an RRC connection release with UE 110 so that UE 110 may transition from the RRC connected state to an RRC idle state. In network environment 100, UE 110 and network 130 (via terrestrial network node 125 or non-terrestrial network node 128 of RAN 120) may implement various schemes pertaining to power saving by data throughput pattern prediction in wireless communications, as described below. It is noteworthy that, although various proposed schemes, options and approaches may be described individually below, in actual applications these proposed schemes, options and approaches may be implemented separately or jointly. That is, in some cases, each of one or more of the proposed schemes, options and approaches may be implemented individually or separately. In other cases, some or all of the proposed schemes, options and approaches may be implemented jointly.

Under various proposed schemes in accordance with the present disclosure, power saving by UE 110 may involve performing or executing certain operations pertaining to data throughput pattern prediction. For instance, UE 110 may perform feature extraction regarding a no-data duration. Additionally, UE 110 may predict or otherwise determine the no-data duration with adaptive triggering timing. Moreover, UE 110 may trigger an early RRC connection release (e.g., before expiry of the RRC inactivity timer), thereby achieving power saving caused by unnecessary power consumption.

It is noteworthy that, in various researches conducted by inventors of the present disclosure, it was observed that there tends to be regular patterns in data throughput in screen-off and long idle-time scenarios. In particular, for web surfing and screen-on scenarios, it was observed that data intervals tend to be irregular while continuous no-data durations tend to be irregular and very short. Moreover, for long idle-time and screen-on scenarios, it was observed that data intervals tend to be less regular while continuous no-data durations tend to be less regular. Furthermore, for long idle-time and screen-off scenarios, it was observed that data intervals tend to be more regular while continuous no-data durations tend to be more regular (e.g., all greater than 10 seconds). It is also noteworthy that, in the present disclosure, the term "D-NoData" refers to a continuous duration of no UL/DL data (e.g., no-data duration) in seconds. It is further noteworthy that, although various proposed schemes may be described below in the context of implementation in or by UE 110, the proposed schemes may also be implemented in the context of artificial intelligence (AI) such as, for example and without limitation, machine learning (ML).

Under a proposed scheme in accordance with the present disclosure with respect to feature extraction for no-data duration (Phase 1), UE 110 may calculate one or more types of features according to data throughput patterns and screen-on/off features. Under the proposed scheme, a first type (Type 1) of features extracted or otherwise calculated may pertain to an average of D-NoData values related features. Illustrative examples may include, for example and without limitation, "the average of latest M D-NoData values"−"the RRC inactivity timer duration+a threshold", "the average of latest M D-NoData values"/"the RRC inactivity timer duration+a threshold", and whether "the average of latest M D-NoData values" is larger than "the RRC inactivity timer duration+a threshold." Here, M is a positive integer greater than 1 (e.g., 20).

Under the proposed scheme, a second type (Type 2) of features extracted or otherwise calculated may pertain to a minimal of D-NoData values related features. Illustrative examples may include, for example and without limitation, "the minimal value of the latest N D-NoData values"−"the learned RRC inactivity timer duration+a threshold", "the minimal value of the latest N D-NoData values"/"the learned RRC inactivity timer duration+a threshold", and whether "the minimal value of the latest N D-NoData values" is larger than "the learned RRC inactivity timer duration+a threshold." Here, N is a positive integer greater than 1 (e.g., 5).

Under the proposed scheme, a third type (Type 3) of features extracted or otherwise calculated may pertain to previous of D-NoData values related features. Illustrative examples may include, for example and without limitation, "the latest D-NoData values"−"the learned RRC inactivity timer duration+a threshold", "the latest D-NoData values"/"the learned RRC inactivity timer duration+a threshold", and whether "the latest D-NoData values" is larger than "the learned RRC inactivity timer duration+a threshold."

Under the proposed scheme, a fourth type (Type 4) of features extracted or otherwise calculated may pertain to a variation or standard deviation of D-NoData values related features. Illustrative examples may include, for example and without limitation, "the variation/standard-deviation of latest X D-NoData values"–"the learned RRC inactivity timer duration+a threshold", "the variation/standard-deviation of latest X D-NoData values"/"the learned RRC inactivity timer duration+a threshold", and whether "the variation/standard-deviation of latest X D-NoData values" is larger than "the learned RRC inactivity timer duration+a threshold." Here, X is a positive integer greater than 1 (e.g., 20).

Under the proposed scheme, a fifth type (Type 5) of features extracted or otherwise calculated may pertain to a percentage of the no-data duration over a predefined duration. An illustrative example may include, for example and without limitation, "the no-data duration"/"the predefined duration." Here, the predefined duration may be 120 seconds (or a different value).

Under the proposed scheme, a sixth type (Type 6) of features extracted or otherwise calculated may pertain to a screen-off status of UE 110. Illustrative examples may include, for example and without limitation, "screen is on/off" and "the duration after screen is turned off."

Under the proposed scheme, a seventh type (Type 7) of features extracted or otherwise calculated may pertain to an average of D-NoData values in one or more specific areas or one or more time periods. Illustrative examples may include, for example and without limitation, "the average D-NoData values in a work place or home" and "the average D-NoData values over a period from 2 AM to 5 AM of a day."

Under a proposed scheme in accordance with the present disclosure with respect to prediction about no-data duration with adaptive triggering timing (Phase 2), UE 110 may predict or otherwise determine whether or not a succeeding D-NoData may be longer than "RRC inactivity timer duration+a threshold duration." Under the proposed schemes, one or more of the various types of features extracted or otherwise calculated as described above may be used as an input to an algorithm for the prediction. The algorithm may involve: (1) assigning different weighting coefficients to input parameters; and (2) predicting probability of "whether the succeeding D-NoData" is longer than "the RRC inactivity timer duration+a threshold duration." For instance, for a threshold of 2 seconds and an RRC inactivity timer duration of 10 seconds, the algorithm may predict or otherwise determine the probability of whether the succeeding D-NoData is longer than 12 seconds (=10 seconds of RRC inactivity timer duration+a threshold of 2 seconds).

Under the proposed scheme, the triggering timing of prediction may be based on the timing of UL/DL throughput dropping to 0 plus a predefined latency. Different latency values may be applied in different scenarios. For instance, in case of a screen-on scenario, a greater latency value may be applied (e.g., 3 seconds). In case of a screen-off scenario, a smaller latency value may be applied (e.g., 0 second). Notably, a longer latency tends to result in a higher accuracy because of skipping some random false prediction cases, whereas a shorter latency tends to result in better power saving.

Figure 2:
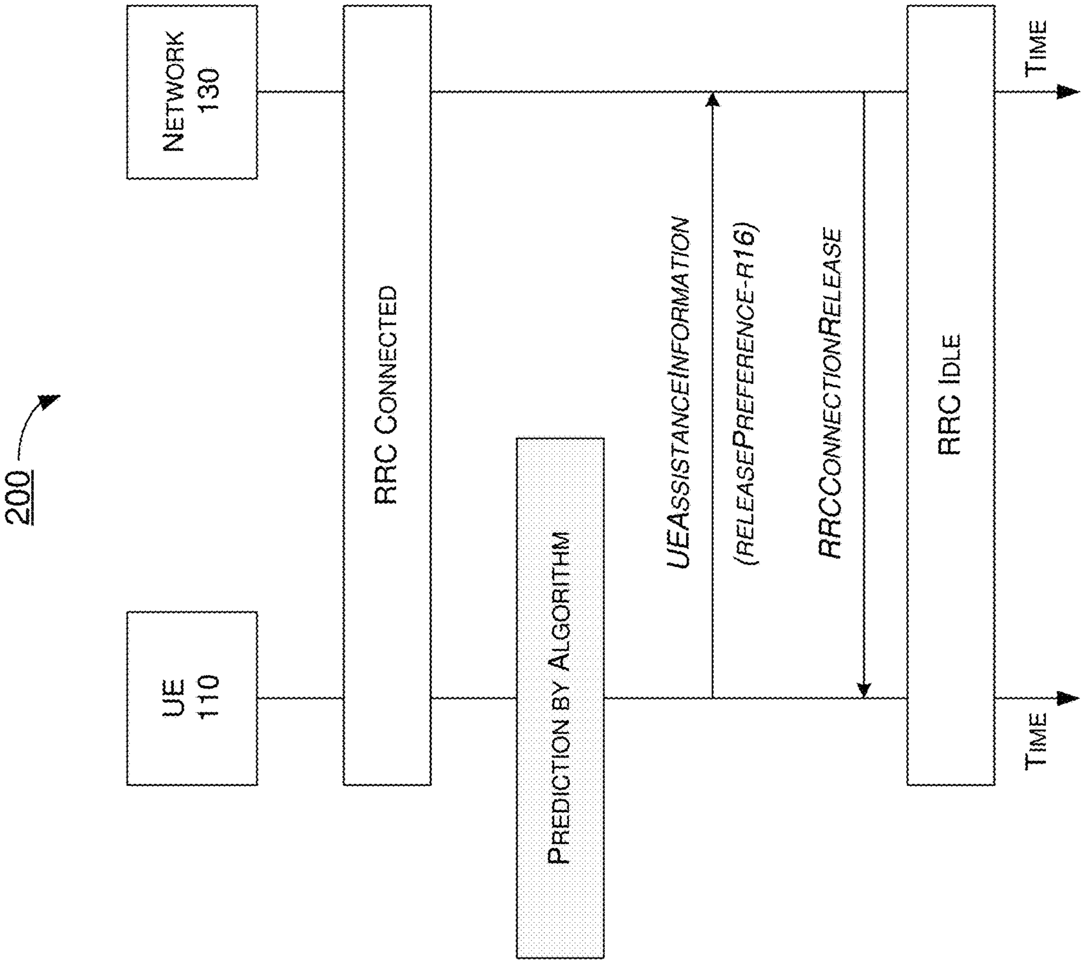
FIG. 2 is a diagram of an example scenario under a proposed scheme in accordance with the present disclosure.

Under a proposed scheme in accordance with the present disclosure with respect to smart early RRC connection release (Phase 3), UE 110 may trigger an early RRC connection release based on a result of the prediction. That is, one condition for UE 110 to trigger early RRC connection release may be that the probability is higher than a probability threshold. For instance, UE 110 may send UEAssistanceInformation (UAI) with a releasePreference-r16 parameter to trigger network 130 to release the RRC connection. Under the proposed scheme, different probability thresholds may be applied in different scenarios. For instance, in case of a screen-on scenario, a higher probability threshold may be applied (e.g., probability >90%). In case of a screen-off scenario, a lower probability threshold may be applied (e.g., probability >50%). FIG. 2 illustrates an example scenario 200 under the proposed scheme. Referring to FIG. 2, UE 110 may trigger early RRC connection release by either 3GPP Release 16 (R16) UAI for power saving or RRC Connection local release.

Under the proposed scheme, Phase 1 and/or Phase 2 may be skipped in case that some of "early RRC connection release criteria" is/are not fulfilled. The early RRC connection release criteria may include, for example and without limitation: (1) the screen of UE 110 should be off (e.g., only when the screen is off; otherwise, can skip prediction if screen is on); (2) since screen off, at least 30 seconds should elapse; (3) during charging; (4) hand gripping of UE 110 by a user; (5) periodically (for observing whether network timer changes); (6) running average prediction accuracy is lower than a threshold; (7) in special test (e.g., free-to-air (FTA) mode or using test subscriber identity module (SIM)); (8) low layer failure existing (e.g., out of service); and (9) cell changing (e.g., handover (HO) or inter-radio-access-technology (inter-RAT) HO).

Figure 3:
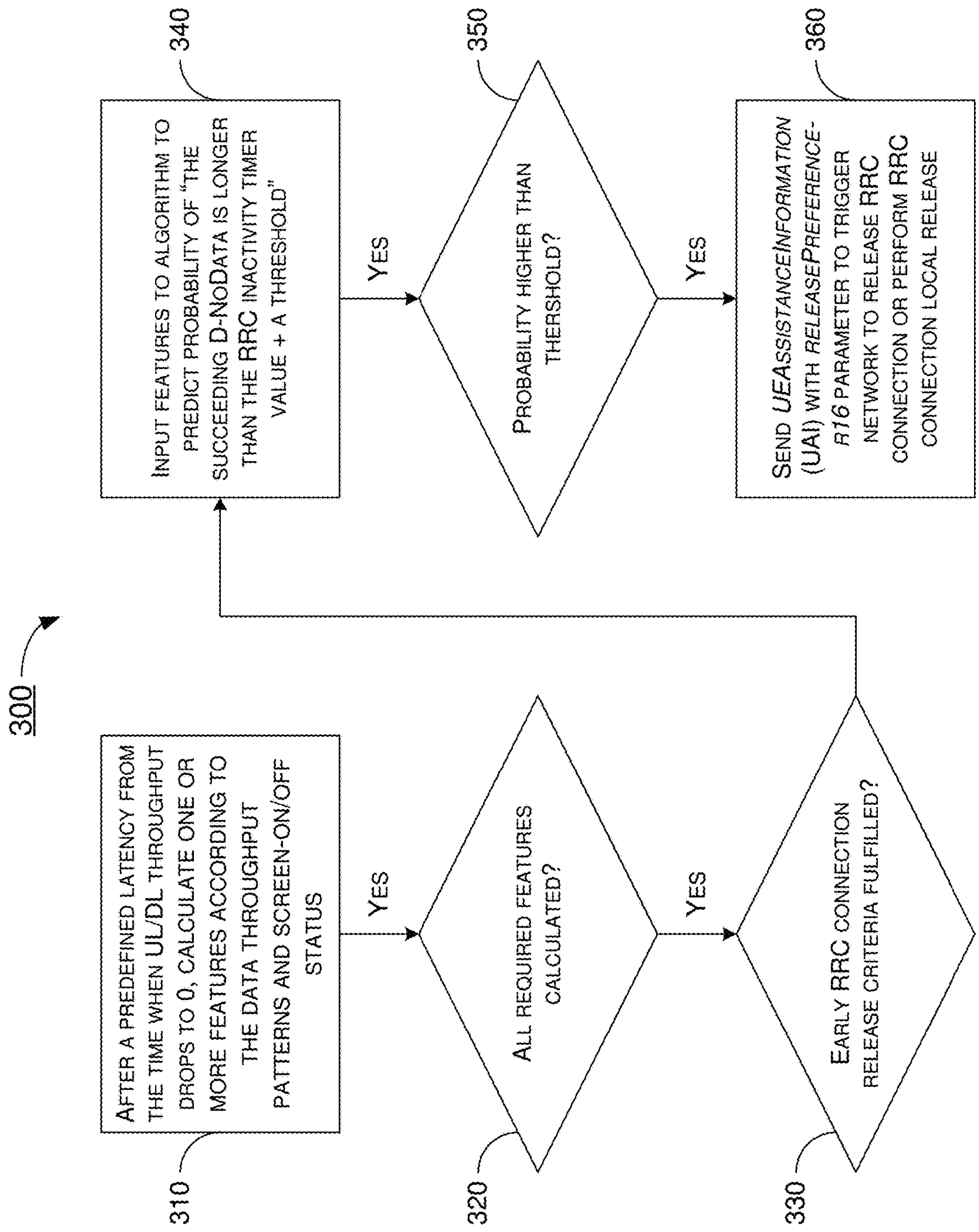
FIG. 3 is a diagram of an example design under a proposed scheme in accordance with the present disclosure.

FIG. 3 illustrates an example design 300 under a proposed scheme in accordance with the present disclosure. Design 300 may involve a flow of various operations of Phase 1, Phase 2 and Phase 3 as described above. Referring to FIG. 3, at 310, after a predefined latency from the time when UL/DL throughput at UE 110 drops to 0, UE 110 may calculate one or more features (e.g., one or more of Type 1~Type 7 of features) according to the data throughput patterns and screen-on/off status of UE 110. At 320, UE 110 may determine whether all required features are calculated. In response to a positive determination at 320, at 330, UE 110 may determine whether the early RRC connection release criteria are fulfilled. In response to a positive determination at 330, at 340, UE 110 may input features to the algorithm described above to predict or otherwise determine a probability of "the succeeding D-NoData is longer than the RRC inactivity timer duration+a threshold duration." At 350, UE 110 may determine whether the probability is higher than a threshold. In response to a positive determination at 350, at 360, UE 110 may send UAI with a releasePreference-r16 parameter to network 130 to trigger network 130 to release the RRC connection or perform RRC connection local release. Upon a negative determination at 320, 330 or 350, the flow may either end or proceed to 310.

Illustrative Implementations

Figure 4:
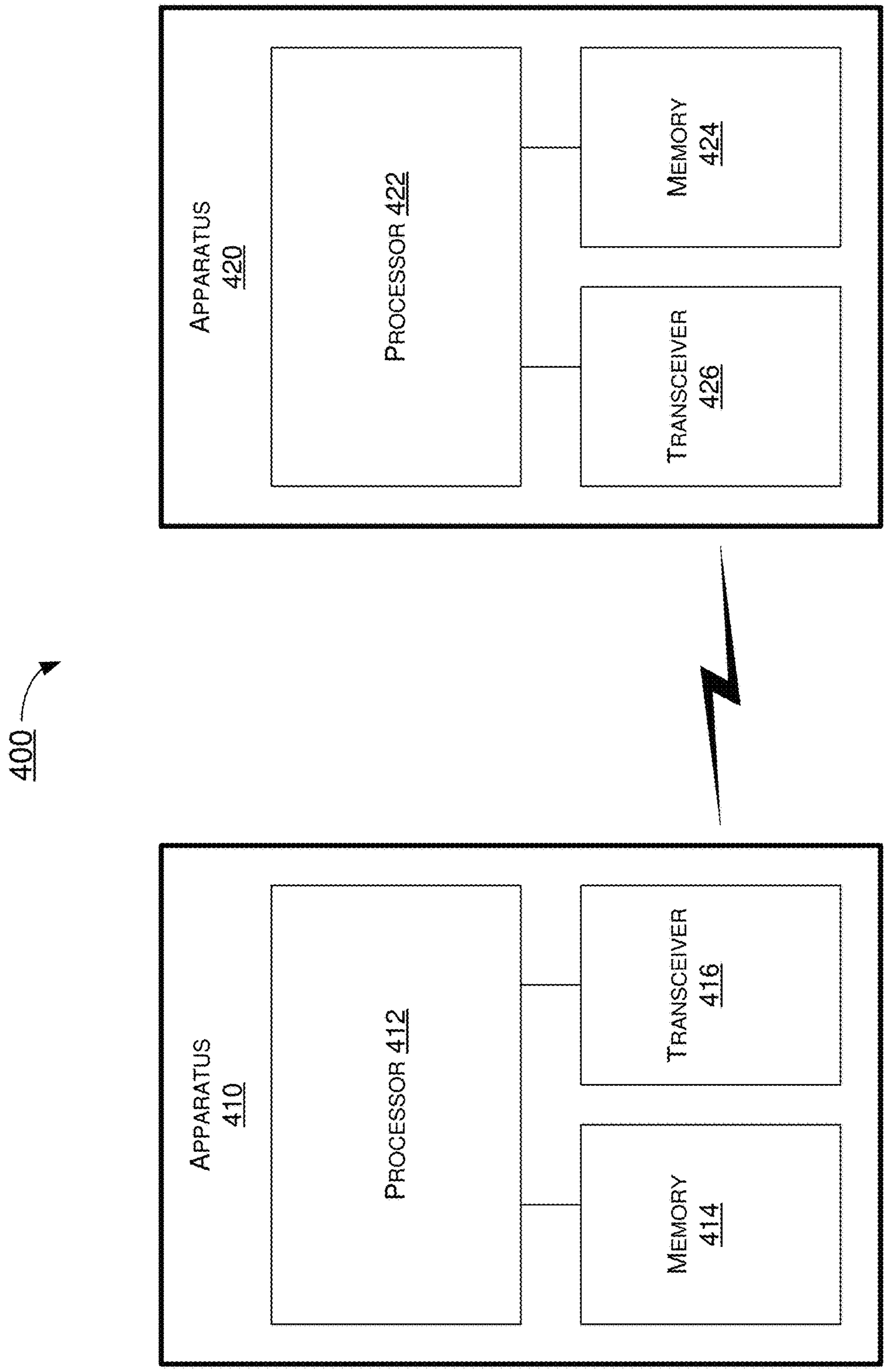
FIG. 4 is a block diagram of an example communication system in accordance with an implementation of the present disclosure.

FIG. 4 illustrates an example communication system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to power saving by data throughput pattern prediction in wireless communications, including the various schemes described above with respect to various proposed designs, concepts, schemes, systems and methods described above, including network environment 100, as well as processes described below.

Each of apparatus 410 and apparatus 420 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 410 and apparatus

420 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in an eNodeB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC or RISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to power saving by data throughput pattern prediction in wireless communications in accordance with various implementations of the present disclosure.

In some implementations, apparatus 410 may also include a transceiver 416 coupled to processor 412. Transceiver 416 may be capable of wirelessly transmitting and receiving data. In some implementations, transceiver 416 may be capable of wirelessly communicating with different types of wireless networks of different radio access technologies (RATs). In some implementations, transceiver 416 may be equipped with a plurality of antenna ports (not shown) such as, for example, four antenna ports. That is, transceiver 416 may be equipped with multiple transmit antennas and multiple receive antennas for multiple-input multiple-output (MIMO) wireless communications. In some implementations, apparatus 420 may also include a transceiver 426 coupled to processor 422. Transceiver 426 may include a transceiver capable of wirelessly transmitting and receiving data. In some implementations, transceiver 426 may be capable of wirelessly communicating with different types of UEs/wireless networks of different RATs. In some implementations, transceiver 426 may be equipped with a plurality of antenna ports (not shown) such as, for example, four antenna ports. That is, transceiver 426 may be equipped with multiple transmit antennas and multiple receive antennas for MIMO wireless communications.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE (e.g., UE 110), and apparatus 420, as a network node (e.g., network node 125) of a network (e.g., network 130 as a 5G/NR mobile network), is provided below in the context of example processes 500 and 600.

Illustrative Processes

Figure 5:
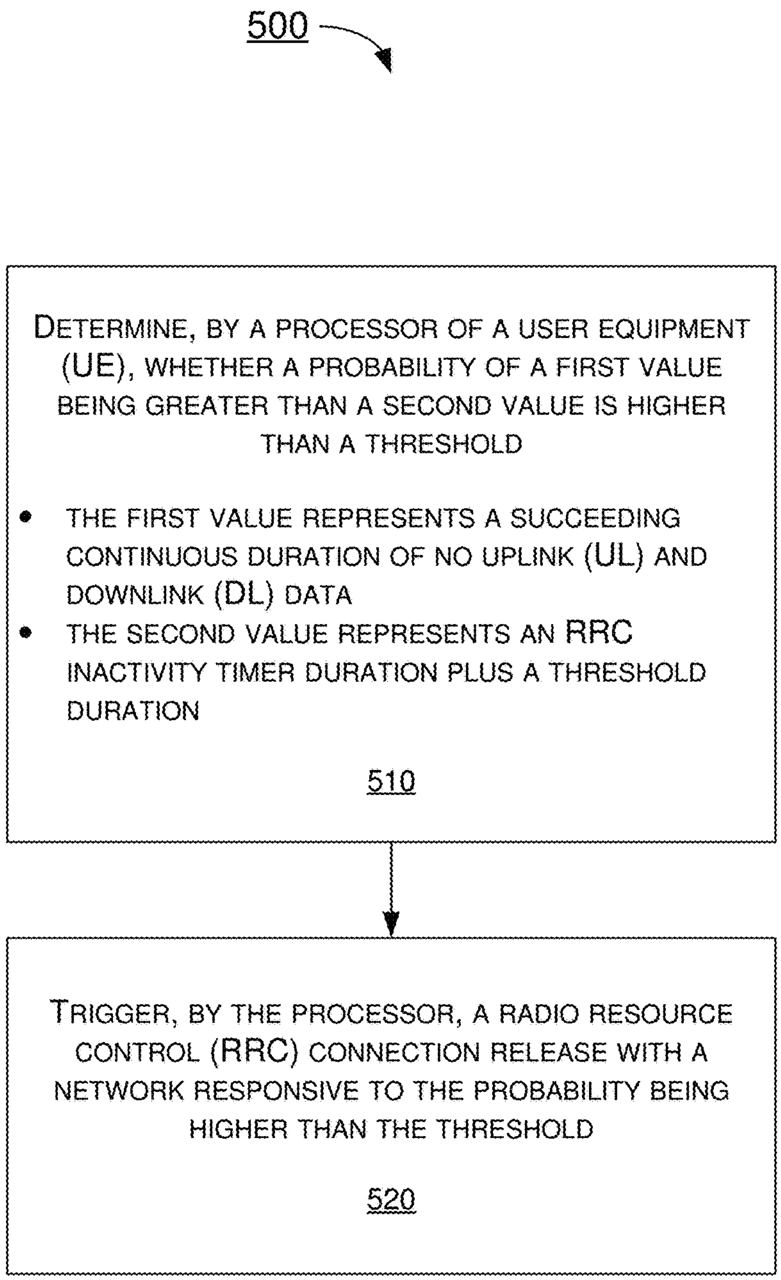
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those pertaining to those described above. More specifically, process 500 may represent an aspect of the proposed concepts and schemes pertaining to power saving by data throughput pattern prediction in wireless communications. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 410 and apparatus 420 as well as any variations thereof. Solely for illustrative purposes and without limiting the scope, process 500 is described below in the context of apparatus 410 as a UE (e.g., UE 110) and apparatus 420 as a communication entity such as a network node or base station (e.g., terrestrial network node 125 or non-terrestrial network node 128) of a network (e.g., network 130 as a 5G/NR mobile network). Process 500 may begin at block 510.

At 510, process 500 may involve processor 412 of apparatus 410 determining whether a probability of a first value being greater than a second value is higher than a threshold. The first value may represent a succeeding continuous duration of no UL and DL data. The second value may represent an RRC inactivity timer duration plus a threshold duration. Process 500 may proceed from 510 to 520.

At 520, process 500 may involve processor 412 triggering, via transceiver 416, an RRC connection release with a network (e.g., network 130 via apparatus 420) responsive to the probability being higher than the threshold.

In some implementations, in determining whether the probability is higher than the threshold, process 500 may involve processor 412 performing certain operations. For instance, process 500 may involve processor 412 extracting a plurality of features, as input parameters, according to data throughput patterns and screen-on/off status of the UE. Additionally, process 500 may involve processor 412 assigning different weighting coefficients to the input parameters. Moreover, process 500 may involve processor 412 determining the probability of the first value being greater than the second value based on the input parameters with different weighting coefficients.

In some implementations, in extracting the plurality of features, process 500 may involve processor 412 calculating a difference or ratio between: (i) an average of M values of latest M continuous durations of no UL and DL data, and (ii) an RRC inactivity timer duration plus a threshold. Here, M may denote a positive integer greater than 1. Alternatively, or additionally, in extracting the plurality of features, process 500 may involve processor 412 calculating a difference or ratio between: (i) a minimal value of latest N continuous durations of no UL and DL data, and (ii) a learned RRC inactivity timer duration plus a threshold. Here, N may denote a positive integer greater than 1. Alternatively, or additionally, in extracting the plurality of features, process 500 may involve processor 412 calculating a difference or ratio between: (i) each of latest continuous durations of no UL and DL data, and (ii) a learned RRC inactivity timer duration plus a threshold. Alternatively, or additionally, in extracting the plurality of features, process 500 may involve processor 412 calculating a difference or ratio between: (i) a variation or standard deviation of latest X continuous durations of no UL and DL data, and (ii) a learned RRC inactivity timer duration plus a threshold. Here, X may denote a positive integer greater than 1. Alternatively, or additionally, in extracting the plurality of features, process 500 may involve processor 412 calculating a percentage of a continuous durations of no UL and DL data in a predefined duration. Alternatively, or additionally, in extracting the plurality of features, process 500 may involve processor 412 calculating a value related to a screen-off status of the UE. Alternatively, or additionally, in extracting the plurality of features, process 500 may involve processor 412 calculating an average of a plurality of continuous durations of no UL and DL data in a specific area or during a specific time period.

In some implementations, in determining the probability of the first value being greater than the second value, process 500 may involve processor 412 performing the determining of the probability of the first value being greater than the second value after a predefined latency from a time when an UL or DL throughput drops to 0. For instance, a longer latency value may be applied for the predefined latency in case of a screen-on scenario. Moreover, a shorter latency value may be applied for the predefined latency in case of a screen-off scenario.

In some implementations, in determining whether the probability is higher than the threshold, process 500 may involve processor 412 determining whether the probability is higher than one of a plurality of thresholds depending on an applicable scenario. For instance, in determining whether the probability is higher than one of the plurality of thresholds, process 500 may involve processor 412 determining whether the probability is higher than a first threshold of the plurality of thresholds in case of a screen-on scenario. Furthermore, process 500 may involve processor 412 determining whether the probability is higher than a second threshold of the plurality of thresholds in case of a screen-off scenario. Here, the first threshold may be higher than the second threshold.

Figure 6:
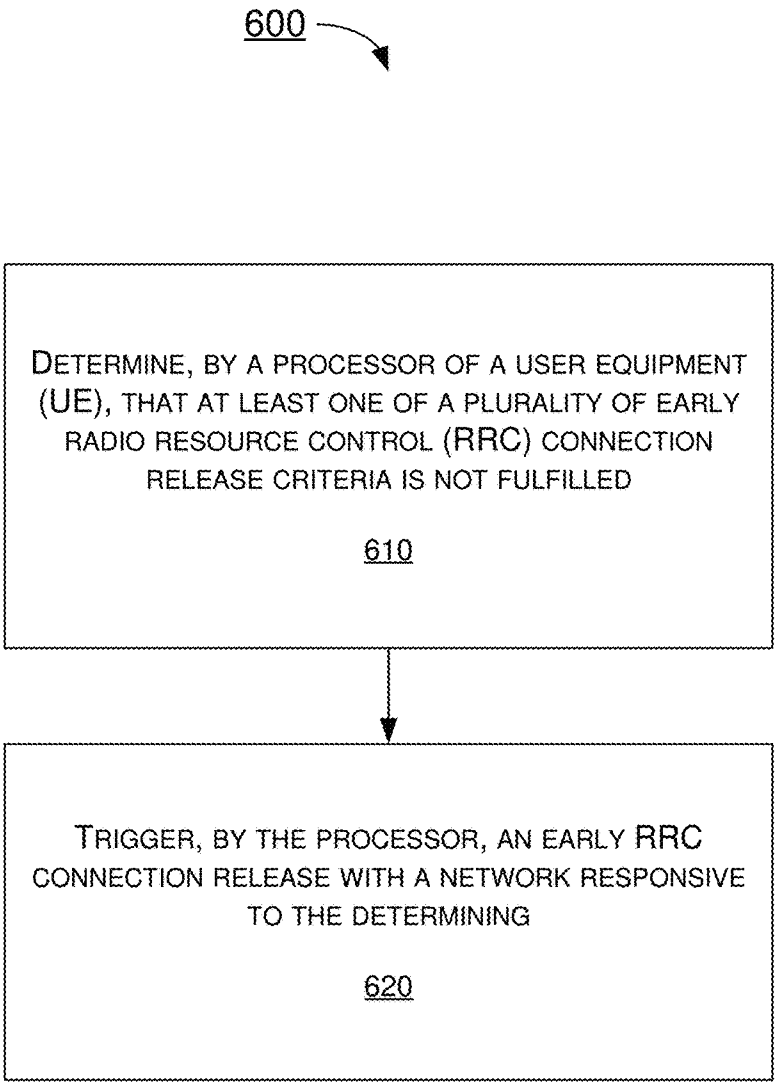
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above, whether partially or entirely, including those pertaining to those described above. More specifically, process 600 may represent an aspect of the proposed concepts and schemes pertaining to power saving by data throughput pattern prediction in wireless communications. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed iteratively. Process 600 may be implemented by or in apparatus 410 and apparatus 420 as well as any variations thereof. Solely for illustrative purposes and without limiting the scope, process 600 is described below in the context of apparatus 410 as a UE (e.g., UE 110) and apparatus 420 as a communication entity such as a network node or base station (e.g., terrestrial network node 125 or non-terrestrial network node 128) of a network (e.g., network 130 as a 5G/NR mobile network). Process 600 may begin at block 610.

At 610, process 600 may involve processor 412 of apparatus 410 determining that at least one of a plurality of early RRC connection release criteria is not fulfilled. Process 600 may proceed from 610 to 620.

At 620, process 600 may involve processor 412 triggering, via transceiver 416, an early RRC connection release with a network (e.g., network 130 via apparatus 420) responsive to the determining.

In some implementations, the plurality of early RRC connection release criteria may include: (1) a screen of the UE being off; (2) a predefined duration having elapsed since the screen has turned off; (3) the UE being charged; (4) a hand of a user gripping the UE; (5) a periodic duration having elapsed; (6) a running average prediction accuracy being lower than a threshold; (7) the UE being in a special test; (8) existence of a lower-layer failure; and (9) a change of cell.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining, by a processor of a user equipment (UE), whether a probability of a first value being greater than a second value is higher than a threshold; and triggering, by the processor, a radio resource control (RRC) connection release with a network responsive to the probability being higher than the threshold, wherein the first value represents a succeeding continuous duration of no uplink (UL) and downlink (DL) data, and wherein the second value represents an RRC inactivity timer duration plus a threshold duration.

2. The method of claim 1, wherein the determining whether the probability is higher than the threshold comprises:

extracting a plurality of features, as input parameters, according to data throughput patterns and screen-on/off status of the UE;

assigning different weighting coefficients to the input parameters; and determining the probability of the first value being greater than the second value based on the input parameters with different weighting coefficients.

3. The method of claim 2, wherein the extracting of the plurality of features comprises calculating a difference or ratio between:

an average of M values of latest M continuous durations of no UL and DL data, and an RRC inactivity timer duration plus a threshold, wherein M denotes a positive integer greater than 1.

4. The method of claim 2, wherein the extracting of the plurality of features comprises calculating a difference or ratio between:

a minimal value of latest N continuous durations of no UL and DL data, and a learned RRC inactivity timer duration plus a threshold, wherein N denotes a positive integer greater than 1.

5. The method of claim 2, wherein the extracting of the plurality of features comprises calculating a difference or ratio between:

each of latest continuous durations of no UL and DL data, and a learned RRC inactivity timer duration plus a threshold.

6. The method of claim 2, wherein the extracting of the plurality of features comprises calculating a difference or ratio between:

a variation or standard deviation of latest X continuous durations of no UL and DL data, and a learned RRC inactivity timer duration plus a threshold, wherein X denotes a positive integer greater than 1.

7. The method of claim 2, wherein the extracting of the plurality of features comprises calculating a percentage of a continuous durations of no UL and DL data in a predefined duration.

8. The method of claim 2, wherein the extracting of the plurality of features comprises calculating a value related to a screen-off status of the UE.

9. The method of claim 2, wherein the extracting of the plurality of features comprises calculating an average of a plurality of continuous durations of no UL and DL data in a specific area or during a specific time period.

10. The method of claim 2, wherein the determining of the probability of the first value being greater than the second value comprises performing the determining of the probability of the first value being greater than the second value after a predefined latency from a time when an UL or DL throughput drops to 0.

11. The method of claim 10, wherein a longer latency value is applied for the predefined latency in case of a screen-on scenario, and wherein a shorter latency value is applied for the predefined latency in case of a screen-off scenario.

12. The method of claim 1, wherein the determining whether the probability is higher than the threshold comprises determining whether the probability is higher than one of a plurality of thresholds depending on an applicable scenario.

13. The method of claim 12, wherein the determining whether the probability is higher than one of the plurality of thresholds comprises:

determining whether the probability is higher than a first threshold of the plurality of thresholds in case of a screen-on scenario; and determining whether the probability is higher than a second threshold of the plurality of thresholds in case of a screen-off scenario, wherein the first threshold is higher than the second threshold.

14. An apparatus implementable in a user equipment (UE), comprising:

a transceiver configured to communicate wirelessly; and a processor coupled to the transceiver and configured to perform operations comprising:

extracting a plurality of features, as input parameters, according to data throughput patterns and screen-on/off status of the UE;

determining, based on a result of the extracting, whether a probability of a first value being greater than a second value is higher than a threshold; and triggering, via the transceiver, a radio resource control (RRC) connection release with a network responsive to the probability being higher than the threshold, wherein the first value represents a succeeding continuous duration of no uplink (UL) and downlink (DL) data, and wherein the second value represents an RRC inactivity timer duration plus a threshold duration.

15. The apparatus of claim 14, wherein the determining whether the probability is higher than the threshold comprises:

assigning different weighting coefficients to the plurality of features as input parameters; and determining the probability of the first value being greater than the second value based on the input parameters with different weighting coefficients.

16. The apparatus of claim 15, wherein the determining of the probability of the first value being greater than the second value comprises performing the determining of the probability of the first value being greater than the second value after a predefined latency from a time when an UL or DL throughput drops to 0.

17. The apparatus of claim 15, wherein the determining of the probability of the first value being greater than the second value comprises performing the determining of the probability of the first value being greater than the second value after a predefined latency from a time when an UL or DL throughput drops to 0, wherein a longer latency value is applied for the predefined latency in case of a screen-on scenario, and wherein a shorter latency value is applied for the predefined latency in case of a screen-off scenario.

18. The apparatus of claim 14, wherein the determining whether the probability is higher than the threshold comprises:

determining whether the probability is higher than a first threshold in case of a screen-on scenario; and determining whether the probability is higher than a second threshold in case of a screen-off scenario, wherein the first threshold is higher than the second threshold.

* * * * *